United States Patent
Wang et al.

(10) Patent No.: US 11,467,754 B2
(45) Date of Patent: Oct. 11, 2022

(54) CAPACITY EXPANSION METHOD AND CAPACITY EXPANSION SYSTEM BASED ON DUAL-LEVEL LIST STRUCTURE

(71) Applicants: TSINGHUA UNIVERSITY, Beijing (CN); Timecho AI Technology Co. Ltd, Shanghai (CN)

(72) Inventors: Jianmin Wang, Beijing (CN); Xiangdong Huang, Beijing (CN); Chen Wang, Beijing (CN); Jinrui Zhang, Beijing (CN); Jiaguang Sun, Beijing (CN)

(73) Assignees: TSINGHUA UNIVERSITY, Beijing (CN); TIMECHO AI TECHNOLOGY CO. LTD, Shanghai (CN)

( * ) Notice: Subject to any disclaimer, the term of this patent is extended or adjusted under 35 U.S.C. 154(b) by 69 days.

(21) Appl. No.: 16/959,897

(22) PCT Filed: Dec. 26, 2018

(86) PCT No.: PCT/CN2018/123979
§ 371 (c)(1),
(2) Date: Jul. 2, 2020

(87) PCT Pub. No.: WO2019/149002
PCT Pub. Date: Aug. 8, 2019

(65) Prior Publication Data
US 2021/0089214 A1    Mar. 25, 2021

(30) Foreign Application Priority Data
Feb. 5, 2018   (CN) .......................... 201810111712.9

(51) Int. Cl.
*G06F 3/06* (2006.01)
*G06F 16/22* (2019.01)
*G06F 16/901* (2019.01)

(52) U.S. Cl.
CPC ............ *G06F 3/065* (2013.01); *G06F 3/0604* (2013.01); *G06F 3/0644* (2013.01);
(Continued)

(58) Field of Classification Search
CPC ...... G06F 3/065; G06F 3/0604; G06F 3/0644; G06F 3/0659; G06F 3/0673; G06F 16/9024; G06F 16/2237
See application file for complete search history.

(56) References Cited

U.S. PATENT DOCUMENTS

| 9,727,244 B2 | 8/2017 | Camp et al. |
| 2013/0151524 A1* | 6/2013 | McKenney ......... G06F 16/9014 707/737 |
| 2016/0077749 A1 | 3/2016 | Ravimohan et al. |

FOREIGN PATENT DOCUMENTS

| CN | 102117278 A | 7/2011 |
| CN | 102279751 A | 12/2011 |

(Continued)

*Primary Examiner* — Edward J Dudek, Jr.
(74) *Attorney, Agent, or Firm* — Stites & Harbison, PLLC; Jeffrey A. Haeberlin; Patrick M. Torre

(57) ABSTRACT

Provided are a capacity expansion method and a capacity expansion system based on a dual-level list structure; a first level list of the dual-level list structure is a first-level array in which at least one array identifier is stored; a second level list of the dual-level list structure includes at least one second-level array, each second-level array stores data to be stored and corresponds to only one array identifier; the method includes: creating a new first-level array when an amount of data stored in the second-level array corresponding to each array identifier reaches a maximum value, a size of a new first-level array being greater than that of a current first-level array, and increasing a number of the second-level arrays; and copying the array identifier stored in the current first-level array to the new first-level array, and replacing the current first-level array with the new first-level array.

11 Claims, 3 Drawing Sheets

(52) U.S. Cl.
CPC .......... *G06F 3/0659* (2013.01); *G06F 3/0673* (2013.01); *G06F 16/2237* (2019.01); *G06F 16/9024* (2019.01)

(56) References Cited

FOREIGN PATENT DOCUMENTS

| | | |
|---|---|---|
| CN | 102479210 A | 5/2012 |
| CN | 105808589 A | 7/2016 |
| CN | 107783812 A | 3/2018 |
| CN | 108256103 A | 7/2018 |

\* cited by examiner

CAPACITY EXPANSION METHOD AND CAPACITY EXPANSION SYSTEM BASED ON DUAL-LEVEL LIST STRUCTURE

CROSS-REFERENCE TO RELATED APPLICATION

This application is a national phase entry of International Application No. PCT/CN2018/123979, filed on Dec. 26, 2018, which is based on and claims priority to Chinese patent application No. 201810111712.9 filed on Feb. 5, 2018, entitled "Capacity Expansion Method and Capacity Expansion System Based on Dual-Level List Structure", which is incorporated herein by reference in its entirety.

BACKGROUND

Technical Field

The present disclosure relates to the field of data management technologies, and specifically, to a capacity expansion method and a capacity expansion system based on a dual-level list structure.

Description of the Related Art

With the continuous development and maturity of modern technologies such as cloud computing, the Internet, the Internet of Things and etc., more and more attention increasingly paid to the storage and use of data. The data comes from all aspects of our life, including the enterprise's production transaction data, human-to-human interaction data in the Internet, monitoring data sent back by sensors in the Internet of Things, etc. and is rapidly expanding and becoming larger. Currently, data is being generated faster and faster, and the amount of data is getting larger and larger.

Stream computing, data storage, data analysis, and etc. are all important technologies in the field of computer data management technologies. As the amount of data increases, the difficulty of research and development of related technology platforms is also rising. Wherein, the list structure (List) is the most commonly used data structure.

In most programming languages, list structures in a memory support dynamic capacity expansion. However, the conventional memory list structure supporting dynamic capacity expansion has problems of slow expansion and waste of memory space due to the limitations of the expansion algorithms when massive amounts of data are stored. For example, in the Java language, ArrayList is a typical implementation of a memory list structure that requires a copy of existing data each time the capacity is expanded. In addition, its expanded capacity is related to the size of the current list, that is, the larger the current list, the larger the newly expanded capacity. Therefore, there will be serious problems of slow speed in capacity expansion and waste of memory space when massive amounts of data are stored.

In view of this, it is urgent to provide a capacity expansion method and a capacity expansion system capable of supporting rapid capacity expansion and effectively improving space utilization, so as to improve the operational efficiency of the data processing platform.

BRIEF SUMMARY

In order to overcome the problems of slow speed in capacity expansion and serious waste of memory space of the list structure in the prior art, the present disclosure provides a capacity expansion method and a capacity expansion system based on a dual-level list structure.

In one aspect, the present disclosure provides a capacity expansion method based on a dual-level list structure, wherein the list in first level of the dual-level list structure is a array in which at least one array identifier is stored, which is called first-level array; the list in second level the dual-level list structure includes at least one array which is called second-level array. And each second-level array is configured to store data to be stored and each second-level array corresponds to only one array identifier; the capacity expansion method includes:

S1, creating a new first-level array when an amount of data stored in the second-level array corresponding to each array identifier reaches a maximum value, a size of a new first-level array being greater than that of a current first-level array, and increasing a number of the second-level arrays; and S2, copying the array identifier stored in the current first-level array to the new first-level array, and replacing the current first-level array with the new first-level array.

Alternatively, the creating the new first-level array when the amount of data stored in the second-level array corresponding to each array identifier reaches a maximum value specifically includes as follows:

the new first-level array having a size of n+d when the current first-level array has a size of n and d is a preset size increment;

newly adding one second-level array, wherein the newly added second-level array corresponds to n+1th array identifier in the new first-level array.

Alternatively, step S1 further includes: continuing to increase the number of the second-level arrays when the amount of data stored in the newly added second-level array reaches the maximum value, until a number of the second-level arrays is equal to that of the array identifiers.

Alternatively, the newly added second-level array has a size of the maximum value.

Alternatively, the step S1 further includes creating one new second-level array when the number of the second-level array is 1 and the amount of data stored in the second-level array does not reach the maximum value, wherein a size of the new second-level array is greater than that of a current second-level array and is not greater than the maximum value; and correspondingly, the step S2 further includes: copying data stored in the current second-level array to the new second-level array, and replacing the current second-level array with the new second-level array.

Alternatively, when the current second-level array has a size of m and the maximum value is M, the new second-level array has a size of min (1.5 m, M).

In one aspect, the present disclosure provides a capacity expansion system based on a dual-level list structure, wherein a first level list of the dual-level list structure is a first-level array in which at least one array identifier is stored; a second level list of the dual-level list structure includes at least one second-level array, each second-level array is configured to store data to be stored and each second-level array corresponds to only one array identifier; the capacity expansion system includes:

a capacity expansion module configured to create a new first-level array when an amount of data stored in the second-level array corresponding to each array identifier reaches a maximum value, a size of a new first-level array being greater than that of a current first-level array, and increase a number of the second-level arrays; and a replacement module configured to copy the array identifier stored in the current first-level array to the new first-level array, and replace the current first-level array with the new first-level array.

Alternatively, the capacity expansion module is further configured to create one new second-level array when the number of the second-level array is 1 and the amount of data stored in the second-level array does not reach the maximum value, wherein a size of the new second-level array is greater than that of a current second-level array and is not greater than the maximum value; and correspondingly, the replacement module is further configured to copy data stored in the current second-level array to the new second-level array, and replace the current second-level array with the new second-level array.

In one aspect, the present disclosure provides a device for a capacity expansion method based on a dual-level list structure, including:

at least one processor; and at least one memory communicatively connected to the processor, wherein:

the memory stores program instructions executable by the processor, the processor calls the program instructions to perform any of the methods described above.

In one aspect, the present disclosure provides a non-transitory computer readable storage medium storing computer instructions that enable a computer to perform any of the methods described above.

The capacity expansion method and a capacity expansion system based on a dual-level list structure provided by the present disclosure achieve the data storage in common by a first level list and a second level list based on a dual-level list structure, wherein the first level list is implemented by using the first-level array in which at least one array identifier is stored; the second level list includes at least one second-level array that stores data, and each second-level array corresponds to only one array identifier in the first-level array; a new first-level array can be created when the amount of data stored in the second-level array corresponding to each array identifier reaches a maximum value, wherein the size of the new first-level array is greater than that of the current first-level array. The array identifiers stored in the current first-level array are copied to the new first-level array, and the current first-level array is replaced with the new first-level array, thus the array identifier in the previous second-level array can correspond to the new first-level array and the data stored in the previous second-level array does not need to be copied. At the same time, the number of the second-level arrays is increased, and the same number of array identifiers are added to the new first-level array, therefore, each second-level array newly added corresponds to a newly added array identifier. Finally, the data to be stored can be stored in the newly added second-level arrays, that is, the capacity expansion can be achieved. When the capacity expansion is performed using the capacity expansion method, it is only necessary to store the data to be stored in the newly added second-level array without copying the data previously stored in the second-level array, which can effectively reduce the amount and the number of times that the data is copied in the memory, thereby effectively increasing the capacity expansion speed. At the same time, during the capacity expansion process, the waste of memory space can be effectively reduced by appropriately controlling the size of the new first-level array and the number of newly added second-level arrays, and the utilization rate of the memory space is improved to some extent. In addition, the data in the second-level array can be queried by the array identifiers by corresponding the second-level arrays to the array identifiers in the first-level array, which is beneficial to improving the query efficiency of the data.

DETAILED DESCRIPTION

The specific implementations of the present disclosure are further described in detail below with reference to the drawings and embodiments. The following embodiments are intended to illustrate the disclosure, but are not intended to limit the scope of the disclosure.

Figure 1:
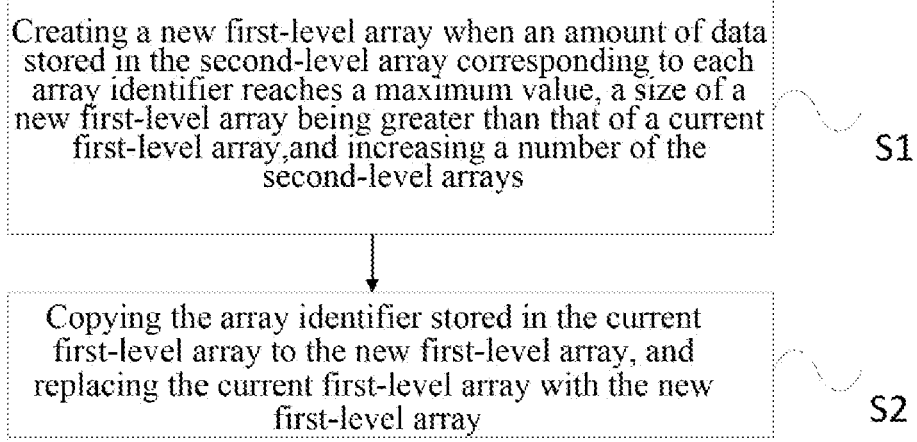
FIG. 1 is a schematic overall flow chart of a capacity expansion method based on a dual-level list structure according to an embodiment of the present disclosure.

FIG. 1 is a schematic overall flow chart of a capacity expansion method based on a dual-level list structure according to an embodiment of the present disclosure. As shown in FIG. 1, the present disclosure provides a capacity expansion method based on a dual-level list structure, wherein a first level list of the dual-level list structure is a first-level array in which at least one array identifier is stored; a second level list of the dual-level list structure includes at least one second-level array, each second-level array is configured to store data to be stored and each second-level array corresponds to only one array identifier; the capacity expansion method includes:

S1, creating a new first-level array when the amount of data stored in the second-level array corresponding to each array identifier reaches a maximum value, the size of the new first-level array being greater than that of the current first-level array, and increasing the number of the second-level arrays; and S2, copying the array identifier stored in the current first-level array to the new first-level array, and replacing the current first-level array with the new first-level array.

Specifically, the capacity expansion method based on a dual-level list structure provided by the present disclosure is implemented based on the dual-level list structure. The first level list of the dual-level list structure is the first-level array of which the size (SIZE) is at least 1, that is, at least one element is stored in the first-level array, and the stored element is an array identifier; the second level list of the dual-level list structure includes at least one second-level array, and each second-level array includes several storage spaces, each storage space is configured to store one data, that is, the data to be stored can be stored in the second-level array when there is a data storage requirement. In addition, each second-level array only corresponds to one array identifier in the first-level array. In an actual application, the data stored in the corresponding second-level array can be queried according to the array identifier.

Figure 2:
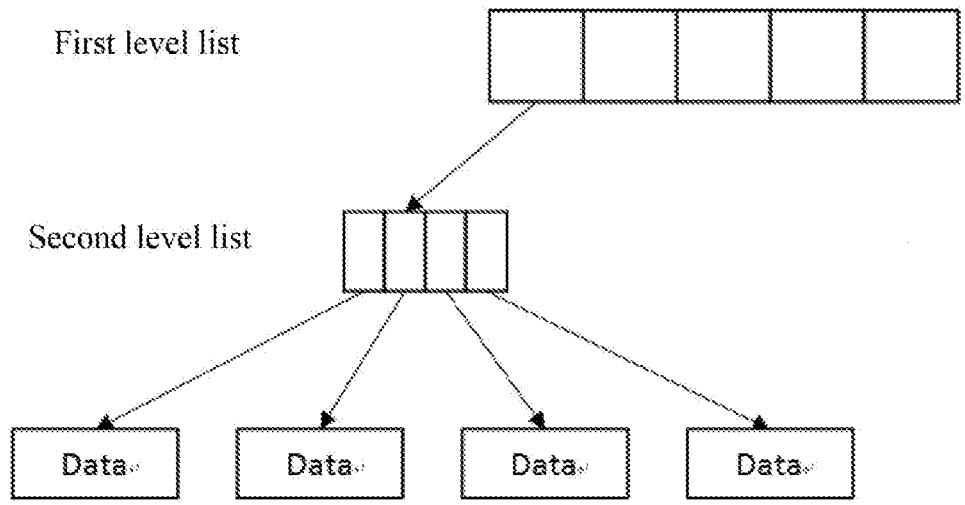
FIG. 2 is a schematic diagram showing the overall structure of a dual-level list structure according to an embodiment of the present disclosure.

For a better understanding of the dual-level list structure in this embodiment, the dual-level list structure is specifically illustrated by the following example. FIG. 2 is a schematic diagram showing the overall structure of a dual-level list structure according to an embodiment of the present disclosure. As shown in FIG. 2, the first level list is the first-level array, the first-level array in FIG. 2 has a size of 5, that is, 5 elements can be stored in the first-level array, and each element stored is specifically an array identifier, which can be, for example, A1, A2, A3, A4 and A5, and can also be other array identifiers. The array identifiers can be set according to actual needs, and are not specifically limited herein. The second level list includes a second-level array including 4 storage spaces, each storage space is configured to store one data, and the second-level array corresponds to the first-level array identifier in the first-level array, wherein the size of the second-level array may not be 4, and may be set according to the actual situations and is not specifically limited herein. In this embodiment, the number of the second-level arrays included in the second level list may also be 2 or 3 or 4 or 5, may be set according to actual conditions, and is not specifically limited herein.

Based on the dual-level list structure above, the specific implementation of the capacity expansion method in this embodiment is as follows.

When each array identifier in the current first-level array corresponds to one second-level array, and the amount of data stored in each second-level array reaches a maximum value, that is, each second-level array has the size of the maximum value, a new first-level array is created when there is data to be stored, and the size of the new first-level array is greater than that of the current first-level array and may be set according to actual needs and is not specifically limited herein; at the same time, the number of the second-level arrays is increased and the number of the second-level arrays added can be set according to actual needs under the premise that the number of the second-level arrays is not greater than that of the array identifiers in the first-level array. The maximum size of each second-level array is the same, that is, the maximum capacity of each second-level array is the same, and the maximum value is preset. In actual applications, the maximum value can be set to 10,000, may be set according to actual conditions and is not specifically limited herein.

Further, the array identifiers stored in the current first-level array are copied to the new first-level array, and the current first-level array is replaced with the new first-level array, thus the array identifier in the previous second-level array can correspond to the new first-level array so that the data stored in the previous second-level array does not need to be copied. In addition, the same number of array identifiers is added to the new first-level array according to the number of the second-level arrays newly added. Therefore, each second-level array newly added corresponds to a newly added array identifier. Finally, the data to be stored can be stored in the newly added second-level arrays, that is, the capacity expansion can be achieved.

The capacity expansion method based on a dual-level list structure provided by the present disclosure achieves the data storage in common by a first level list and a second level list based on a dual-level list structure, wherein the first level list is implemented by using the first-level array in which at least one array identifier is stored; the second level list includes at least one second-level array that stores data, and each second-level array corresponds to only one array identifier in the first-level array; a new first-level array can be created when the amount of data stored in the second-level array corresponding to each array identifier reaches a maximum value, wherein the size of the new first-level array is greater than that of the current first-level array. The array identifiers stored in the current first-level array are copied to the new first-level array, and the current first-level array is replaced with the new first-level array, thus the array identifier in the previous second-level array can correspond to the new first-level array and the data stored in the previous second-level array does not need to be copied. At the same time, the number of the second-level arrays is increased, and the same number of array identifiers are added to the new first-level array, therefore, each second-level array newly added corresponds to a newly added array identifier. Finally, the data to be stored can be stored in the newly added second-level arrays, that is, the capacity expansion can be achieved. When the capacity expansion is performed using the capacity expansion method, it is only necessary to store the data to be stored in the newly added second-level array without copying the data previously stored in the second-level array, which can effectively reduce the number of times that the data is copied in the memory, thereby effectively increasing the capacity expansion speed. At the same time, during the capacity expansion process, the waste of memory space can be effectively reduced by appropriately controlling the size of the new first-level array and the number of newly added second-level arrays, and the utilization rate of the memory space is improved to some extent. In addition, the data in the second-level array can be queried by the array identifiers by corresponding the second-level arrays to the array identifiers in the first-level array, which is beneficial to improving the query efficiency of the data.

Based on any of the embodiments described above, a capacity expansion method based on a dual-level list structure is provided. The method of creating the new first-level array when the amount of data stored in the second-level array corresponding to each array identifier reaches a maximum value specifically includes as follows.

The new first-level array has the size of n+d when the current first-level array has the size of n and d is a preset size increment.

Correspondingly, one second-level array is newly added, wherein the newly added second-level array corresponds to n+1th array identifier in the new first-level array.

Specifically, during the capacity expansion process above, when each of the current array identifiers has a corresponding second-level array and the data stored in each second-level array reaches a preset maximum value, a new first-level array is created. Wherein, the new first-level array has the size of n+d when the current first-level array has the size of n wherein d is a preset size increment of the first-level array, that is, the capacity of the first-level array can be expanded in a quantitatively increasing manner, the value of d can be specifically set to 100, or can be set to other values according to the actual data storage needs and is not specifically limited herein. On the basis of creating the new first-level array, the number of the second-level arrays is increased at the same time. Since the maximum capacity of the second-level arrays is generally up to 10,000, that is, a second-level array can store a large amount of data, and only one second-level array is added in this embodiment, the n+1th array identifier is newly added in the n+1th position in the new first-level array and thus the second-level array newly added corresponds to the n+1th array identifier in order to effectively control the memory space and avoid waste of memory space. Therefore, the data to be stored can be stored in the newly added second-level array, thereby effectively achieving the expansion of capacity. In addition, the size of the newly added second-level array can be set according to actual needs, and is not specifically limited herein.

Figure 3:
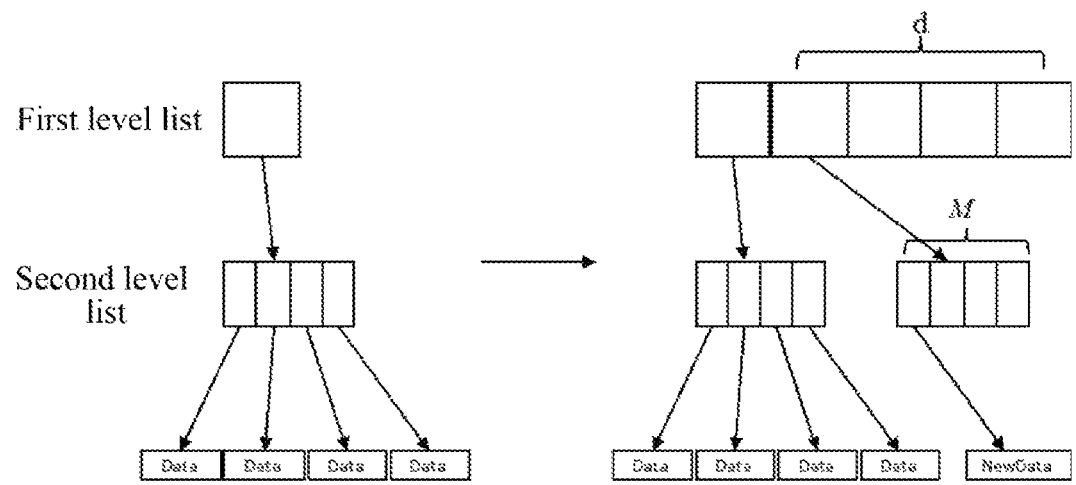
FIG. 3 is a diagram showing an example of expanding the capacity of a dual-level list structure according to an embodiment of the present disclosure.

In order to facilitate the understanding of the capacity expansion method in the embodiments described above, the capacity expansion method is specifically illustrated by the following example. FIG. 3 is a diagram showing an example of expanding the capacity of a dual-level list structure according to an embodiment of the present disclosure. As shown in FIG. 3, FIG. 3 (left) is the current dual-level list structure, wherein the current first-level array has the size of 1, and stores one array identifier which corresponds to one second-level array, and the amount of data stored in the second-level array reaches a maximum value M, that is, the second-level array has the size of M. When a new data needs to be stored in the current dual-level list structure, a new first-level array is created, as shown in FIG. 3 (right), the newly added first-level array has the size of 1+d, where d is a preset size increment. The specific value of d can be generally set to 100 and d is shown schematically in FIG. 3. One second-level array is added newly at the same time, the newly added second-level array has the size of M (the drawing only schematically represents M) and corresponds to the second-level array identifier in the new first-level array. Therefore, the new data can be stored in the new second-level array.

According to the capacity expansion method based on a dual-level list structure provided by the present disclosure, during the capacity expansion process, the difference value between the size of the created new first-level array and that of the current first-level array is a preset size increment, that is, the first-level array is quantitatively expanded, regardless of the amount of data currently stored, and the expansion amount of the memory space can be set within a fixed range; since the capacity of the second-level array is generally large, only one second-level array is added when the new first-level array is created, and the data to be stored is stored finally in the newly added second-level array, thereby achieving the capacity expansion; the memory space is effectively controlled in the whole process, the waste of memory space is effectively avoided and the utilization rate of memory space is improved; and it is only necessary to store the data to be stored in the newly added second-level array without copying the data previously stored in the previous second-level array, the number of times that the data is copied in the memory can be effectively reduced, thereby effectively increasing the capacity expansion speed.

Based on any of the embodiments described above, a capacity expansion method based on a dual-level list structure is provided, and after step S1, the method further includes: continuing to increase the number of the second-level arrays when the amount of data stored in the newly added second-level array reaches the maximum value, until the number of the second-level arrays is equal to that of the array identifiers.

Specifically, on the basis of the technical solutions described above, when the amount of data stored in the newly added second-level array reaches a preset maximum value, that is, when the capacity of the newly added second-level array reaches a maximum, one newly second-level array will be added again, and when the amount of data stored in the newly added second-level array also reaches a preset maximum value, another second-level array will be continued to be added, and so on, until the number of the second-level arrays is equal to that of the array identifiers in the new first-level array, that is, each second-level array corresponds to one array identifier. When the capacity in each second-level array reaches a maximum value at this time, a new first-level array is recreated again, and then step S1 above is repeatedly performed, and the details are not described herein again.

According to the capacity expansion method based on a dual-level list structure provided by the present disclosure, on the basis that a new first-level array is created, one second-level array is newly added firstly, the increase in the number of the second-level arrays is continued when the amount of the data stored in the newly added second-level array reaches the maximum value until the number of the second-level arrays is equal to that of the array identifiers in the new first-level array. By adding the number of the second-level array one by one during the whole process, the memory space can be effectively controlled, the waste of memory space is effectively avoided and the utilization rate of the memory space is improved.

Based on any of the above embodiments, a capacity expansion method based on a dual-level list structure is provided, and the size of the newly added second-level array is the maximum value.

Specifically, on the basis of the technical solutions described above, when each array identifier in the first-level array has a corresponding second-level array, and the amount of data stored in each second-level array reaches a maximum value, a new first-level array is created and the number of second-level arrays is increased. In view of the fact that the amount of data stored in each of the second-level arrays has been maximized, and the capacity of each of the second-level arrays is generally up to 10,000, the amount of data currently stored is large. On this basis, when the size of the newly added second-level array does not reach the maximum value, the capacity of the newly added second-level array needs to be expanded later, and the data currently stored needs to be copied during the capacity expansion process of the newly added second-level array. In the view of the fact that the amount of data currently stored is large, the size of the newly added second-level array is directly set to the maximum value in this embodiment in order to effectively reduce the number of times that the data is copied, so that the subsequent capacity expansion of the newly added second-level array is avoided and it is only necessary to store the data to be stored in the newly added second-level array without copying the data previously stored in the second-level array, thereby improving the storage efficiency of the data.

In addition, the size of the newly added second-level array can also be set according to actual data storage needs in other embodiments, and is not specifically limited herein.

According to the capacity expansion method based on a dual-level list structure provided by the present disclosure, when the amount of data stored in the second-level array corresponding to each array identifier reaches a maximum value, a new first-level array is created, and the number of second-level arrays is increased and the size of the newly added second-level array is set to the maximum value, the subsequent capacity expansion of the newly added second-level array is avoided and it is only necessary to store the data to be stored in the newly added second-level array, so that the problem of copying a large amount of data existing in the subsequent capacity expansion process is effectively avoided, and the capacity expansion speed is effectively increased, thereby improving the storage efficiency of the data.

Based on any of the above embodiments, a capacity expansion method based on a dual-level list structure is provided in which step S1 further includes: creating one new second-level array when the number of the second-level array is 1 and the amount of data stored in the second-level array does not reach the maximum value, wherein the size of the new second-level array is greater than that of the current second-level array and is not greater than the maximum value; and correspondingly, step S2 further includes: copying the data stored in the current second-level array to the new second-level array, and replacing the current second-level array with the new second-level array.

Specifically, during the capacity expansion process above, in the initial state, when the number of the current second-level array is only 1, and the amount of data stored in the second-level array does not reach a maximum value, a new second-level array is created when new data needs to be stored, wherein the size of the new second-level array is greater than that of the current second-level array and is not greater than the maximum value. That is, for the first second-level array in the second layer list, the corresponding size in the initial state can be 1, that is, only one data is stored, and the capacity of the second-level array needs to be expanded when new data needs to be stored, and the capacity of the second-level array can be gradually expanded according to the actual data storage needs until the size of the second-level array is a preset maximum value.

Further, on this basis, the data stored in the current second-level array is copied into the new second-level array, and the current second-level array is replaced with the new second-level array, so that the new data can be stored in the new second-level array, thereby achieving capacity expansion. That is, in the early stage of capacity expansion, since there is less data stored, the capacity of the second-level array can be expanded only step by step. Although it is necessary to copy the data stored, the number of times that the data is copied is small since there is less data stored, and there is no need to expand the capacity of the first-level array in the first layer list, thereby effectively avoiding the waste of the memory space.

According to the capacity expansion method based on a dual-level list structure provided by the present disclosure, when there is only one second-level array currently, and the amount of data stored in the second-level array does not reach a maximum value, a new second-level array is created, wherein the size of the new second-level array is greater than that of the current second-level array and is not greater than the maximum value, the data stored in the current second-level array is finally copied into the new second-level array, and the current second-level array is replaced with the new second-level array, so that the new data can be stored in the new second-level array, thereby achieving capacity expansion. That is, in the early stage of capacity expansion, since there is less data stored, only the capacity of the second-level array in the second layer list needs to be expanded step by step and there is no need to expand the capacity of the first-level array in the first layer list, thereby effectively avoiding the waste of the memory space and improving the utilization rate of the memory space.

Based on any of the above embodiments, a capacity expansion method based on a dual-level list structure is provided, when the current second-level array has the size of m and the maximum value is M, the new second-level array has the size of min (1.5 m, M).

Specifically, on the basis of the technical solutions described above, when there is only one second-level array in the current second layer list, and the amount of data stored in the second-level array does not reach a maximum value, a new second-level array can be created when new data needs to be stored. In an embodiment of the present disclosure, when the current second-level array has the size of m and the maximum value above is M, the new second-level array can be set to have the size of min (1.5 m, M), wherein 1.5 m represents 1.5 times of the size of the current second-level array, that is, the new second-level array can be set to have the size of 1.5 times of the size of the current second-level array in the case that the size of the new second-level array is not more than the maximum value, i.e., a multiplied capacity expansion mode is adopted for the second-level array. In practical applications, when the size of the current second-level array is an odd number, the result of 1.5 m above can be obtained by round up to an integer.

In addition, the size of the new second-level array can also be set according to actual data storage needs in other embodiments, and is not specifically limited herein.

According to the capacity expansion method based on a dual-level list structure provided by the present disclosure, when there is only one second-level array in the current second layer list, and the amount of data stored in the second-level array does not reach a maximum value, a new second-level array can be created when new data needs to be stored and the new second-level array can be set to have the size of 1.5 times of the size of the current second-level array in the case that the size of the new second-level array is not more than the maximum value. That is, in the early stage of capacity expansion, since there is less data stored, the capacity of the second-level array is expanded in a multiplied capacity expansion mode under the premise of considering the number of times at which the data is copied and thus the number of capacity expansions can be effectively controlled, which is beneficial to increase the capacity expansion speed and helps to improve the storage efficiency of the data.

Figure 4:
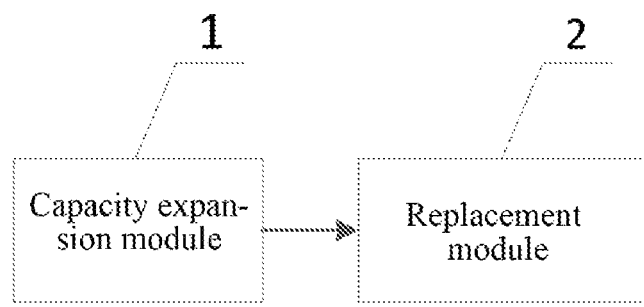
FIG. 4 is a schematic diagram showing the overall structure of a capacity expansion system based on a dual-level list structure according to an embodiment of the present disclosure.

FIG. 4 is a schematic diagram showing the overall structure of a capacity expansion system based on a dual-level list structure according to an embodiment of the present disclosure. As shown in FIG. 4, the present disclosure provides a capacity expansion system based on a dual-level list structure, wherein a first layer list of the dual-level list structure is a first-level array in which at least one array identifier is stored; a second layer list of the dual-level list structure includes at least one second-level array, each second-level array is configured to store data to be stored and each second-level array corresponds to only one array identifier; the capacity expansion system includes:

a capacity expansion module 1 configured to create a new first-level array when the amount of data stored in the second-level array corresponding to each array identifier reaches a maximum value, wherein the size of the new first-level array is greater than that of the current first-level array, and increase the number of the second-level arrays; and a replacement module 2 configured to copy the array identifier stored in the current first-level array to the new first-level array, and replace the current first-level array with the new first-level array.

Specifically, the capacity expansion system based on a dual-level list structure provided by the present disclosure is implemented based on the dual-level list structure. The first layer list of the dual-level list structure is the first-level array of which the size (SIZE) is at least 1, that is, at least one element is stored in the first-level array, and the stored element is an array identifier; the second layer list of the dual-level list structure includes at least one second-level array, and each second-level array includes several storage spaces, each storage space is configured to store one data, that is, the data to be stored can be stored in the second-level array when there is a data storage requirement. In addition, each second-level array only corresponds to one array identifier in the first-level array. In an actual application, the data stored in the corresponding second-level array can be queried according to the array identifier.

On the basis of the technical solutions described above, the capacity expansion system based on a dual-level list structure provided by the present disclosure includes a capacity expansion module 1 and a replacement module 2 through which the capacity expansion method described in any of the embodiments above is implemented. The specific implementation is as follows.

When each array identifier in the current first-level array corresponds to one second-level array, and the amount of data stored in each second-level array reaches a maximum value, that is, each second-level array has the size of the maximum value, a new first-level array is created using the capacity expansion module 1 when there is data to be stored, and the size of the new first-level array is greater than that of the current first-level array and may be set according to actual needs and is not specifically limited herein; at the same time, the number of the second-level arrays is increased using the capacity expansion module 1 and the number of the second-level arrays added can be set according to actual needs under the premise that the number of the second-level arrays is not greater than that of the array identifiers in the first-level array. The maximum size of each second-level array is the same, that is, the maximum capacity of each second-level array is the same, and the maximum value is preset. In actual applications, the maximum value can be set to 10,000. It could also be set according to actual conditions and is not specifically limited herein.

Further, the array identifiers stored in the current first-level array are copied to the new first-level array using the replacement module 2, and the current first-level array is replaced with the new first-level array, thus the array identifier in the previous second-level array can correspond to the new first-level array so that the data stored in the previous second-level array does not need to be copied. In addition, the same number of array identifiers is added to the new first-level array according to the number of the second-level arrays newly added. Therefore, each second-level array newly added corresponds to a newly added array identifier. Finally, the data to be stored can be stored in the newly added second-level arrays, that is, the capacity expansion can be achieved.

The capacity expansion system based on a dual-level list structure provided by the present disclosure achieves the data storage in common by a first layer list and a second layer list based on a dual-level list structure, wherein the first layer list is implemented by using the first-level array in which at least one array identifier is stored; the second layer list includes at least one second-level array that store data, and each second-level array corresponds to only one array identifier; a new first-level array can be created when the amount of data stored in the second-level array corresponding to each array identifier reaches a maximum value, wherein the size of the new first-level array is greater than that of the current first-level array. The array identifiers stored in the current first-level array are copied to the new first-level array, and the current first-level array is replaced with the new first-level array, thus the array identifier in the previous second-level array can correspond to the new first-level array and the data stored in the previous second-level array does not need to be copied. At the same time, the number of the second-level arrays is increased, and the same number of array identifiers are added to the new first-level array, therefore, each second-level array newly added corresponds to a newly added array identifier. Finally, the data to be stored can be stored in the newly added second-level arrays, that is, the capacity expansion can be achieved. When the capacity expansion is performed using the capacity expansion method, it is only necessary to store the data to be stored in the newly added second-level array without copying the data previously stored in the second-level array, which can effectively reduce the number of times that the data is copied in the memory, thereby effectively increasing the capacity expansion speed. At the same time, during the capacity expansion process, the waste of memory space can be effectively reduced by appropriately controlling the size of the new first-level array and the number of newly added second-level arrays, and the utilization rate of the memory space is improved to some extent. In addition, the data in the second-level array can be queried by the array identifiers by corresponding the second-level arrays to the array identifiers in the first-level array, which is beneficial to improving the query efficiency of the data.

Based on any of the above embodiments, a capacity expansion system based on a dual-level list structure is provided in which the capacity expansion module 1 is further configured to: create one new second-level array when the number of the second-level array is 1 and the amount of data stored in the second-level array does not reach the maximum value, wherein the size of the new second-level array is greater than that of the current second-level array and is not greater than the maximum value.

Correspondingly, the replacement module 2 is further configured to copy the data stored in the current second-level array to the new second-level array, and replace the current second-level array with the new second-level array.

Specifically, during the capacity expansion process above, in the initial state, when the number of the current second-level array is only 1, and the amount of data stored in the second-level array does not reach a maximum value, a new second-level array is created using the capacity expansion module 1 when new data needs to be stored, wherein the size of the new second-level array is greater than that of the current second-level array and is not greater than the maximum value. That is, for the first second-level array in the second layer list, the corresponding size in the initial state can be 1, that is, only one data is stored, and the capacity of the second-level array needs to be expanded using capacity expansion module 1 when new data needs to be stored, and the capacity of the second-level array can be gradually expanded according to the actual data storage needs until the size of the second-level array is a preset maximum value.

Further, on this basis, the data stored in the current second-level array is copied into the new second-level array, and the current second-level array is replaced with the new second-level array using the replacement module 2, so that the new data can be stored in the new second-level array, thereby achieving capacity expansion. That is, in the early stage of capacity expansion, since there is less data stored, the capacity of the second-level array can be expanded only step by step. Although it is necessary to copy the data stored, the number of times that the data is copied is small since there is less data stored, and there is no need to expand the capacity of the first-level array in the first layer list, thereby effectively avoiding the waste of the memory space.

According to the capacity expansion system based on a dual-level list structure provided by the present disclosure, when there is only one second-level array currently, and the second-level array is full but the amount of data stored in the second-level array does not reach a maximum value, a new second-level array is created, wherein the size of the new second-level array is greater than that of the current second-level array and is not greater than the maximum value, the data stored in the current second-level array is finally copied into the new second-level array, and the current second-level array is replaced with the new second-level array, so that the new data can be stored in the new second-level array, thereby achieving capacity expansion. That is, in the early stage of capacity expansion, since there is less data stored, only the capacity of the second-level array in the second layer list needs to be expanded step by step and there is no need to expand the capacity of the first-level array in the first layer list, thereby effectively avoiding the waste of the memory space and improving the utilization rate of the memory space.

Figure 5:
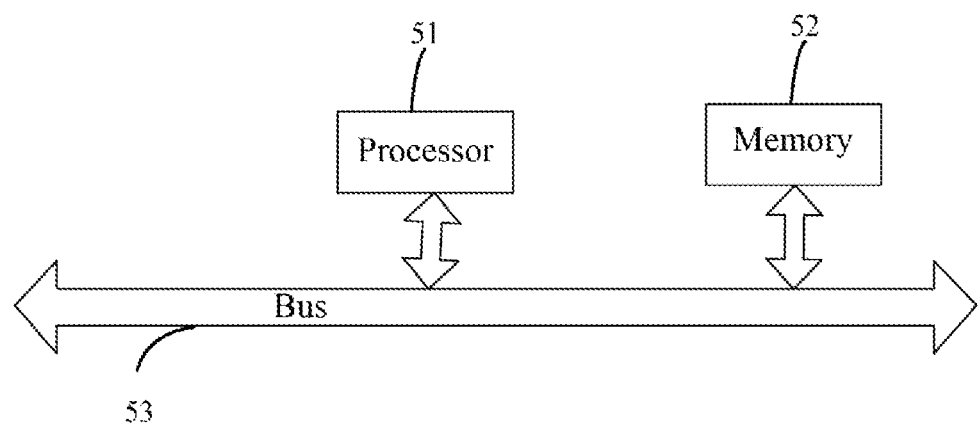
FIG. 5 is a schematic diagram showing the structural frame of a device for a capacity expansion method based on a dual-level list structure according to an embodiment of the present disclosure.

FIG. 5 shows a structural block diagram of a device for a capacity expansion method based on a dual-level list structure according to an embodiment of the present disclosure. Referring to FIG. 5, the device for a capacity expansion method based on a dual-level list structure includes a processor 51, a memory 52, and a bus 53; wherein the processor 51 and the memory 52 are communicated with each other through the bus 53; the processor 51 is configured to call program instructions in the memory 52 to perform the methods provided by the method embodiments above, for example, including: creating a new first-level array when the amount of data stored in the second-level array corresponding to each array identifier reaches a maximum value, the size of the new first-level array being greater than that of the current first-level array, and increasing the number of the second-level arrays; and copying the array identifier stored in the current first-level array to the new first-level array, and replacing the current first-level array with the new first-level array.

The embodiment discloses a computer program product including computer programs stored on a non-transitory computer readable storage medium, the computer programs include program instructions, and when the program instructions are executed by a computer, the computer can perform the methods provided by the method embodiments above, for example, including: creating a new first-level array when the amount of data stored in the second-level array corresponding to each array identifier reaches a maximum value, the size of the new first-level array being greater than that of the current first-level array, and increasing the number of the second-level arrays; and copying the array identifier stored in the current first-level array to the new first-level array, and replacing the current first-level array with the new first-level array.

The embodiment provides a non-transitory computer readable storage medium storing computer instructions enabling a computer to perform the methods provided by the method embodiments above, for example, including: creating a new first-level array when the amount of data stored in the second-level array corresponding to each array identifier reaches a maximum value, the size of the new first-level array being greater than that of the current first-level array, and increasing the number of the second-level arrays; and copying the array identifier stored in the current first-level array to the new first-level array, and replacing the current first-level array with the new first-level array.

It can be understood by a person of ordinary skill in the art that, all or part of the steps of implementing the method embodiments above may be completed by using hardware related to the program instructions. The foregoing programs may be stored in a computer readable storage medium, and the programs perform foregoing steps including the method embodiments above when executed. The foregoing storage medium includes various mediums that can store program codes, such as ROM, RAM, magnetic disk, optical disk and etc.

The above-mentioned embodiments of the device for a capacity expansion method based on a dual-level list structure are merely illustrative, wherein the units described as separate components may or may not be physically separated, and the components displayed as units may or may not be physical units, that is, the components may be located at the same place, or can be distributed to multiple network units. Some or all of the modules may be selected according to actual needs to achieve the purpose of the solutions of the embodiments. Those of ordinary skill in the art can understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the technical solutions of the present disclosure or a part of the technical solutions, which are essential or contribute to the prior art, may be embodied in the form of a software product, which is stored in a storage medium such as ROM/RAM, magnetic disc, optical disc, and etc., including several instructions to enable a computer device (which may be a personal computer, a server, or a network device, and etc.) to perform the methods described in the various embodiments or a part of embodiments.

In summary, the capacity expansion system and method based on a dual-level list structure provided by the present disclosure achieve the data storage in common by a first level list and a second level list based on a dual-level list structure, wherein the first level list is implemented by using the first-level array in which at least one array identifier is stored; the second level list includes at least one second-level array that stores data, and each second-level array corresponds to only one array identifier in the first-level array; a new first-level array can be created when the amount of data stored in the second-level array corresponding to each array identifier reaches a maximum value, wherein the size of the new first-level array is greater than that of the current first-level array. The array identifiers stored in the current first-level array are copied to the new first-level array, and the current first-level array is replaced with the new first-level array, thus the array identifier in the previous second-level array can correspond to the new first-level array and the data stored in the previous second-level array does not need to be copied. At the same time, the number of the second-level arrays is increased, and the same number of array identifiers are added to the new first-level array, therefore, each second-level array newly added corresponds to a newly added array identifier. Finally, the data to be stored can be stored in the newly added second-level arrays, that is, the capacity expansion can be achieved. When the capacity expansion is performed using the capacity expansion method, it is only necessary to store the data to be stored in the newly added second-level array without copying the data previously stored in the second-level array, which can effectively reduce the number of times that the data is copied in the memory, thereby effectively increasing the capacity expansion speed. At the same time, during the capacity expansion process, the waste of memory space can be effectively reduced by appropriately controlling the size of the new first-level array and the number of newly added second-level arrays, and the utilization rate of the memory space is improved to some extent. In addition, the data in the second-level array can be queried by the array identifiers by corresponding the second-level arrays to the array identifiers in the first-level array, which is beneficial to improving the query efficiency of the data.

Finally, the methods of the present disclosure are only preferred embodiments and are not intended to limit the scope of the present disclosure. Any modification, equivalent substitution, improvement, and etc. made within the spirit and scope of the present disclosure is included within the scope of the present disclosure.

What is claimed is:

1. A capacity expansion method based on a dual-level list structure, wherein a first level list of the dual-level list structure is a first-level array in which at least one array identifier is stored; a second level list of the dual-level list structure includes at least one second-level array, each second-level array is configured to store data to be stored and each second-level array corresponds to only one array identifier; the capacity expansion method comprises:
creating a new first-level array when an amount of data stored in the second-level array corresponding to each array identifier reaches a maximum value, a size of a new first-level array being greater than that of a current first-level array, and increasing a number of the second-level arrays; and
copying the array identifier stored in the current first-level array to the new first-level array, and replacing the current first-level array with the new first-level array;
whereby the only one array identifier corresponding to a previous second-level array is the same as the array identifier copied to the new first-level array such that data in the previous second-level array need not be copied, and further wherein each new second-level array of the increased number of second-level arrays receives a new array identifier which is copied to the new first level array.

2. The method according to claim 1, wherein the creating the new first-level array when the amount of data stored in the second-level array corresponding to each array identifier reaches a maximum value specifically comprises:
the new first-level array having a size of n+d when the current first-level array has a size of n and d being a preset size increment; and
newly adding one second-level array, wherein the newly added second-level array corresponds to n+1th array identifier in the new first-level array.

3. The method according to claim 2, further comprising: continuing to increase the number of the second-level arrays when the amount of data stored in the newly added second-level array reaches the maximum value, until a number of the second-level arrays is equal to that of the array identifiers.

4. The method according to claim 2, wherein the newly added second-level array has a size of the maximum value.

5. The method according to claim 1, further comprising: creating one new second-level array when the number of the second-level array is 1 and the amount of data stored in the second-level array does not reach the maximum value, wherein a size of the new second-level array is greater than that of a current second-level array and is not greater than the maximum value; and
copying data stored in the current second-level array to the new second-level array, and replacing the current second-level array with the new second-level array.

6. The method according to claim 5, wherein when the current second-level array has a size of m and the maximum value is M, the new second-level array has a size of min (1.5 m, M).

7. A capacity expansion system based on a dual-level list structure, wherein a first layer list of the dual-level list structure is a first-level array in which at least one array identifier is stored; a second layer list of the dual-level list structure includes at least one second-level array, each second-level array is configured to store data to be stored and each second-level array corresponds to only one array identifier; the system comprising:
a capacity expansion module configured to create a new first-level array when an amount of data stored in the second-level array corresponding to each array identifier reaches a maximum value, a size of a new first-level array being greater than that of a current first-level array, and increase a number of the second-level arrays; and
a replacement module configured to copy the array identifier stored in the current first-level array to the new first-level array, and replace the current first-level array with the new first-level array;
whereby the only one array identifier corresponding to a previous second-level array is the same as the array identifier copied to the new first-level array such that data in the previous second-level array need not be copied, and further wherein each new second-level array of the increased number of second-level arrays receives a new array identifier which is copied to the new first level array.

8. The system according to claim 7, wherein the capacity expansion module is further configured to create one new second-level array when the number of the second-level array is 1 and the amount of data stored in the second-level array does not reach the maximum value, wherein a size of the new second-level array is greater than that of a current second-level array and is not greater than the maximum value; and
the replacement module is further configured to copy data stored in the current second-level array to the new second-level array, and replace the current second-level array with the new second-level array.

9. A device for a capacity expansion method based on a dual-level list structure, comprising:
at least one processor; and
at least one memory communicatively connected to the processor, wherein:
the memory stores program instructions executable by the processor, the processor calls the program instructions to perform the method according to claim 1.

10. A non-transitory computer readable storage medium storing computer instructions that enable a computer to perform the method of claim 1.

11. The method according to claim 3, wherein the newly added second-level array has a size of the maximum value.

* * * * *